United States Patent
Chandy

(10) Patent No.: US 10,399,591 B2
(45) Date of Patent: Sep. 3, 2019

(54) STEERING COMPENSATION WITH GRIP SENSING

(71) Applicant: Steering Solutions IP Holding Corporation, Saginaw, MI (US)

(72) Inventor: Ashok Chandy, Palo Alto, CA (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 184 days.

(21) Appl. No.: 15/283,628

(22) Filed: Oct. 3, 2016

(65) Prior Publication Data

US 2018/0093700 A1 Apr. 5, 2018

(51) Int. Cl.
*B62D 1/04* (2006.01)
*B62D 5/04* (2006.01)
*B62D 6/10* (2006.01)

(52) U.S. Cl.
CPC .......... *B62D 5/0463* (2013.01); *B62D 1/043* (2013.01); *B62D 6/10* (2013.01)

(58) Field of Classification Search
CPC ......... B62D 5/0463; B62D 6/10; B62D 1/043
See application file for complete search history.

(56) References Cited

U.S. PATENT DOCUMENTS

| | | |
|---|---|---|
| 4,315,117 A | 2/1982 | Kokubo et al. |
| 4,337,967 A | 7/1982 | Yoshida et al. |
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,469,356 A | 11/1995 | Hawkins et al. |
| 5,488,555 A | 1/1996 | Asgari et al. |

(Continued)

FOREIGN PATENT DOCUMENTS

| | | |
|---|---|---|
| CN | 1722030 | 1/2006 |
| CN | 1736786 | 2/2006 |

(Continued)

OTHER PUBLICATIONS

China Patent Application No. 201510204221.5 Second Office Action dated Mar. 10, 2017, 8 pages.

(Continued)

*Primary Examiner* — Thomas Ingram

(57) ABSTRACT

A system for grip-based handwheel compensation includes a net handwheel torque moment determination module that determines a net handwheel torque moment between a left grip and a right grip on a handwheel. The system also includes a filter transition compensation module that applies a filter to smooth transitions in the net handwheel torque moment as a bias compensation. The system further includes a handwheel torque compensation module that determines a grip compensated handwheel torque based on a difference between a sensed handwheel torque and the bias compensation.

20 Claims, 5 Drawing Sheets

(56) References Cited

U.S. PATENT DOCUMENTS

| | | |
|---|---|---|
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,138,788 A | 10/2000 | Bohner et al. |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. et al. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 | 11/2002 | Millsap et al. |
| 6,575,263 B2 | 6/2003 | Hjelsand et al. |
| 6,578,449 B1 | 6/2003 | Anspaugh et al. |
| 6,598,695 B1 | 7/2003 | Menjak et al. |
| 6,611,745 B1 | 8/2003 | Paul |
| 6,612,392 B2 | 9/2003 | Park et al. |
| 6,612,393 B2 | 9/2003 | Bohner et al. |
| 6,778,890 B2 | 8/2004 | Shimakage et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 6,889,792 B1 | 5/2005 | Fardoun et al. |
| 7,021,416 B2 | 4/2006 | Kapaan et al. |
| 7,048,305 B2 | 5/2006 | Muller |
| 7,062,365 B1 | 6/2006 | Pei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,170,751 B2 | 5/2012 | Lee et al. |
| 8,260,482 B1 | 9/2012 | Szybalski et al. |
| 8,352,110 B1 | 1/2013 | Szybalski et al. |
| 8,374,743 B2 | 2/2013 | Salinger |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 | 1/2014 | Quinn et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 | 5/2014 | Lisseman et al. |
| 8,798,852 B1 | 8/2014 | Chen et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,915,164 B2 | 12/2014 | Moriyama |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,159,221 B1 | 10/2015 | Stantchev |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,207,856 B2 | 12/2015 | Imai |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,315,210 B2 | 4/2016 | Sears et al. |
| 9,333,983 B2 | 5/2016 | Lathrop et al. |
| 9,360,865 B2 | 6/2016 | Yopp |
| 9,714,036 B2 | 7/2017 | Yamaoka et al. |
| 9,725,098 B2 | 8/2017 | Abou-Nasr et al. |
| 9,810,727 B2 | 11/2017 | Kandler et al. |
| 9,845,109 B2 | 12/2017 | George et al. |
| 9,852,752 B1 | 12/2017 | Chou et al. |
| 9,868,449 B1 | 1/2018 | Holz et al. |
| 10,040,330 B2 | 8/2018 | Anderson |
| 10,137,929 B2 | 11/2018 | Aoki et al. |
| 2002/0016661 A1 | 2/2002 | Frediani et al. |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0133330 A1 | 7/2004 | Ono et al. |
| 2004/0182640 A1* | 9/2004 | Katou .................... B62D 5/049 |
| | | 180/446 |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0275205 A1* | 12/2005 | Ahnafield ............. B62D 1/043 |
| | | 280/771 |
| 2006/0224287 A1 | 10/2006 | Izawa et al. |
| 2006/0244251 A1 | 11/2006 | Muller |
| 2006/0271348 A1 | 11/2006 | Rossow et al. |
| 2007/0021889 A1* | 1/2007 | Tsuchiya ................ B62D 1/286 |
| | | 701/41 |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |

(56) References Cited

U.S. PATENT DOCUMENTS

| | | |
|---|---|---|
| 2009/0024278 A1 | 1/2009 | Kondo et al. |
| 2009/0189373 A1 | 7/2009 | Schramm et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1* | 9/2010 | Buerkle ............ B62D 15/025 701/41 |
| 2010/0250081 A1* | 9/2010 | Kinser ............... B60T 8/00 701/70 |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0224876 A1 | 9/2011 | Paholics et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0325202 A1 | 1/2013 | Howard et al. |
| 2013/0087006 A1 | 4/2013 | Luan |
| 2013/0158771 A1 | 6/2013 | Kaufmann |
| 2013/0218396 A1 | 8/2013 | Moshchuk |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2014/0012469 A1 | 1/2014 | Kunihiro et al. |
| 2014/0028008 A1 | 1/2014 | Stadler et al. |
| 2014/0046542 A1 | 2/2014 | Kauffman et al. |
| 2014/0046547 A1 | 2/2014 | Kaufmann et al. |
| 2014/0111324 A1 | 4/2014 | Lisseman et al. |
| 2014/0152551 A1 | 6/2014 | Mueller et al. |
| 2014/0156107 A1 | 6/2014 | Karasawa et al. |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0300479 A1 | 10/2014 | Wolter et al. |
| 2014/0303827 A1 | 10/2014 | Dolgov et al. |
| 2014/0306799 A1 | 10/2014 | Ricci |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1 | 1/2015 | Sekiya |
| 2015/0014086 A1 | 1/2015 | Eisenbarth |
| 2015/0032322 A1 | 1/2015 | Wimmer |
| 2015/0032334 A1 | 1/2015 | Jang |
| 2015/0051780 A1 | 1/2015 | Hahne |
| 2015/0120142 A1 | 1/2015 | Park et al. |
| 2015/0060185 A1 | 3/2015 | Feguri |
| 2015/0120124 A1 | 4/2015 | Bartels et al. |
| 2015/0120141 A1 | 4/2015 | Lavoie et al. |
| 2015/0246673 A1 | 4/2015 | Tseng et al. |
| 2015/0123947 A1 | 5/2015 | Jubner et al. |
| 2015/0149035 A1 | 5/2015 | Enthaler et al. |
| 2015/0210273 A1 | 7/2015 | Kaufmann et al. |
| 2015/0251666 A1 | 7/2015 | Attard et al. |
| 2015/0283998 A1 | 9/2015 | Lind et al. |
| 2015/0324111 A1 | 9/2015 | Jubner et al. |
| 2015/0314804 A1 | 11/2015 | Aoki et al. |
| 2015/0338849 A1 | 11/2015 | Nemec et al. |
| 2016/0001781 A1 | 1/2016 | Fung et al. |
| 2016/0009332 A1 | 1/2016 | Sirbu |
| 2016/0071418 A1 | 3/2016 | Oshida et al. |
| 2016/0075371 A1 | 3/2016 | Varunjikar et al. |
| 2016/0082867 A1 | 3/2016 | Sugioka et al. |
| 2016/0200246 A1 | 3/2016 | Lisseman et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207536 A1 | 7/2016 | Yamaoka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0244070 A1 | 8/2016 | Bendewald et al. |
| 2016/0347347 A1 | 8/2016 | Lubischer |
| 2016/0347348 A1 | 8/2016 | Lubischer |
| 2016/0280251 A1 | 9/2016 | George et al. |
| 2016/0288825 A1 | 10/2016 | Varunjikar et al. |
| 2016/0291862 A1 | 10/2016 | Yaron et al. |
| 2016/0318540 A1 | 11/2016 | King |
| 2016/0318542 A1 | 11/2016 | Pattok et al. |
| 2016/0355207 A1 | 12/2016 | Urushibata |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0364003 A1 | 12/2016 | O'Brien |
| 2016/0368522 A1 | 12/2016 | Lubischer |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0066473 A1 | 3/2017 | Yu et al. |
| 2017/0101032 A1 | 4/2017 | Sugioka et al. |
| 2017/0101127 A1 | 4/2017 | Varunjikar et al. |
| 2017/0113712 A1 | 4/2017 | Watz |
| 2017/0151950 A1 | 6/2017 | Lien |
| 2017/0151977 A1 | 6/2017 | Varunjikar et al. |
| 2017/0151978 A1 | 6/2017 | Oya et al. |
| 2017/0158055 A1 | 6/2017 | Kim et al. |
| 2017/0158222 A1 | 6/2017 | Schulz et al. |
| 2017/0166222 A1 | 6/2017 | James |
| 2017/0203785 A1 | 7/2017 | Naik et al. |
| 2017/0225704 A1 | 8/2017 | Urushibata |
| 2017/0232998 A1 | 8/2017 | Ramanujam et al. |
| 2017/0240204 A1 | 8/2017 | Raad et al. |
| 2017/0242428 A1 | 8/2017 | Pal et al. |
| 2017/0293306 A1 | 10/2017 | Riefe et al. |
| 2017/0297606 A1 | 10/2017 | Kim et al. |
| 2017/0305425 A1 | 10/2017 | Xing |
| 2017/0305458 A1 | 10/2017 | Wang et al. |
| 2017/0334458 A1 | 11/2017 | Sato et al. |
| 2018/0015948 A1 | 1/2018 | Varunjikar et al. |
| 2018/0017968 A1 | 1/2018 | Zhu et al. |
| 2018/0029632 A1 | 2/2018 | Bodtker |
| 2018/0059661 A1 | 3/2018 | Sato et al. |
| 2018/0059662 A1 | 3/2018 | Sato et al. |
| 2018/0072341 A1 | 3/2018 | Schulz et al. |
| 2018/0105198 A1 | 4/2018 | Bodtker et al. |
| 2018/0148087 A1 | 5/2018 | Wang et al. |

FOREIGN PATENT DOCUMENTS

| | | |
|---|---|---|
| CN | 101037117 | 9/2007 |
| CN | 101041355 | 9/2007 |
| CN | 101596903 | 12/2009 |
| CN | 102320324 A | 1/2012 |
| CN | 102452391 | 5/2012 |
| CN | 202563346 U | 11/2012 |
| CN | 102939474 A | 2/2013 |
| CN | 103419840 | 12/2013 |
| CN | 103448785 A | 12/2013 |
| CN | 103677253 A | 3/2014 |
| CN | 103777632 A | 5/2014 |
| CN | 103818386 A | 5/2014 |
| CN | 104968554 A | 10/2015 |
| DE | 19523214 A1 | 1/1997 |

(56) References Cited

FOREIGN PATENT DOCUMENTS

| | | |
|---|---|---|
| DE | 19923012 | 11/2000 |
| DE | 10212782 A1 | 10/2003 |
| DE | 102005032528 | 1/2007 |
| DE | 102005056438 A1 | 6/2007 |
| DE | 102006025254 | 12/2007 |
| DE | 102008057313 | 10/2009 |
| DE | 102010025197 A1 | 12/2011 |
| DE | 102014204855 A1 | 9/2014 |
| DE | 102013110865 A1 | 4/2015 |
| DE | 102014223128 A1 | 5/2016 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | S60157963 A | 8/1985 |
| JP | S60164629 A | 8/1985 |
| JP | H05162652 | 6/1993 |
| JP | 2768034 B2 | 6/1998 |
| JP | 2007253809 A | 10/2007 |
| JP | 2011043884 A | 3/2011 |
| JP | 20174099 A | 1/2017 |
| KR | 20100063433 A | 6/2010 |
| WO | 0147762 A1 | 7/2001 |
| WO | 2006099483 A1 | 9/2006 |
| WO | 2007034567 A1 | 3/2007 |
| WO | 2010082394 A1 | 7/2010 |
| WO | 2010116518 | 10/2010 |
| WO | 2013080774 A1 | 6/2013 |
| WO | 2013101058 A1 | 7/2013 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "FUndamentals of Vehicla Dynamics"; Society of Automotive Enginers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Partial European Search Report for related European Patent Application No. 14156901.8, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Varunjikar, Tejas; Design of Horizontal Curves With DownGrades Using Low-Order Vehicle Dynamics Models; A Theisis by T. Varunkikar; 2011; 141 pages.
English Translation of Chinese Office Action and Search Report for Chinese Application No. 201610832736.4 dated Mar. 22, 2018, 6 pages.
CN Patent Application No. 201610575225.9 First Office Action dated Jan. 22, 2018, 10 pages.
English Translation of Chinese Office Action and Search Report for Chinese Application No. 201210599006.6 dated Jan. 27, 2015, 9 pages.
English Translation of Chinese Office Action and Search Report for Chinese Application No. 201310178012.9 dated Apr. 13, 2015, 13 pages.
English Translation of Chinese Office Action and Search Report for Chinese Application No. 201410089167.X dated Feb. 3, 2016, 9 pages.
English Translation of Chinese Office Action and Search Report for Chinese Application No. 2016103666609.X dated Dec. 20, 2017, 8 pages.
European Search Report for European Patent Application No. 14156903.8 dated Jan. 27, 2015, 10 pages.
Yan, et al., "EPS Control Technology Based on Road Surface Conditions," Jun. 22-25, 2009, pp. 933-938, 2009 IEEE International Conference on Information and Automation.

* cited by examiner

STEERING COMPENSATION WITH GRIP SENSING

BACKGROUND OF THE INVENTION

Steering systems are typically tuned by engineers holding a steering wheel (also referred to as a handwheel) with two hands in a symmetric grip pattern (e.g., 9/3 o'clock or 10/2 o'clock hand positions). However, in operation, drivers often adapt the grip patterns for comfort which can result in asymmetric grip patterns. Such an asymmetric grip pattern often results in a bias torque on the handwheel due to the weight of the driver's arm acting on the rim of the handwheel with unbalanced moment arms. This bias torque is very similar to the steering pull due to chassis/tire imbalances. The unbalance has to be compensated by the arm muscles of the driver and can result in driver fatigue over longer times/distances.

Another situation occurs when a driver shifts from two-handed to one-handed driving. This can take place either due to arm fatigue or because the driver is performing another task with the free hand, e.g., holding a beverage cup, operating an infotainment system, etc. A steering system tuned for two-handed driving can be significantly more fatiguing to drive with one hand, as the force required in a single hand has to be doubled to produce the same input shaft torque.

SUMMARY OF THE INVENTION

A system for grip-based handwheel compensation includes a net handwheel torque moment determination module that determines a net handwheel torque moment between a left grip and a right grip on a handwheel. The system also includes a filter transition compensation module that applies a filter to smooth transitions in the net handwheel torque moment as a bias compensation. The system further includes a handwheel torque compensation module that determines a grip compensated handwheel torque based on a difference between a sensed handwheel torque and the bias compensation. Grip force or pressure can be determined with respect to a grip area on the handwheel.

A steering system includes a handwheel torque sensor operable to produce a sensed handwheel torque, a steering actuator motor, and a control module. The control module is operable to determine a net handwheel torque moment between a left grip and a right grip on a handwheel, apply a filter to smooth transitions in the net handwheel torque moment as a bias compensation, determine a grip compensated handwheel torque based on a difference between the sensed handwheel torque and the bias compensation, and control the steering actuator motor based on the grip compensated handwheel torque.

A method for grip-based handwheel compensation includes determining, by a control module of a steering system, a net handwheel torque moment between a left grip and a right grip on a handwheel. A filter is applied to smooth transitions in the net handwheel torque moment as a bias compensation. A grip compensated handwheel torque is determined based on a difference between a sensed handwheel torque and the bias compensation.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
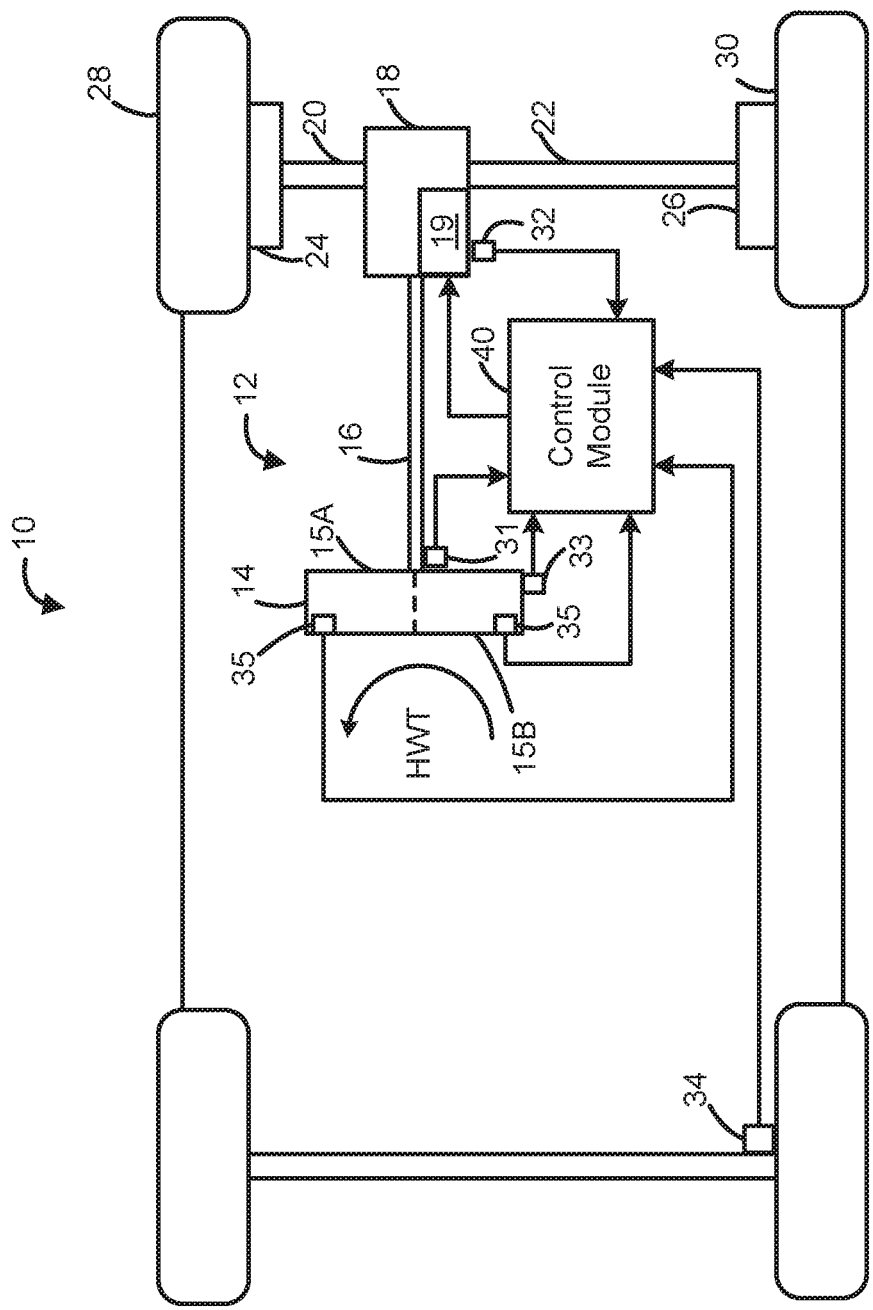
FIG. 1 illustrates a functional block diagram illustrating a vehicle including a steering system in accordance with some embodiments.

Referring now to the Figures, where the invention will be described with reference to specific embodiments, without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to a left tie rod 20 and a right tie rod 22 of the vehicle 10. The steering assist unit 18 includes, for example, a rack and pinion steering mechanism (not shown) that may be coupled through the steering shaft 16 to a steering actuator motor 19 and gearing. During operation, as the handwheel 14 is turned by a vehicle operator, the steering actuator motor 19 provides the assistance to move the left tie rod 20 and the right tie rod 22 which in turn moves left and right steering knuckles 24, 26, respectively. The left knuckle 24 is coupled to a left roadway wheel 28, and the right knuckle 26 is coupled to a right roadway wheel 30 of the vehicle 10.

As shown in FIG. 1, the vehicle 10 further includes various sensors 31-35 that detect and measure signals of the steering system 12 and/or of the vehicle 10. The sensors 31-35 generate sensor signals based on the measured signals. In one embodiment, a handwheel torque sensor 31 is provided for sensing a torque placed on the handwheel 14. In the exemplary embodiment as shown, the handwheel torque sensor 31 is placed on the handwheel 14, however it is to be understood that the handwheel torque sensor 31 may not always be placed near or on the handwheel 14. In one embodiment, a motor position/velocity sensor 32 senses motor position and/or velocity, and a handwheel position/velocity sensor 33 senses handwheel position and/or velocity. In addition, the vehicle 10 may include a wheel speed sensor 34 to assist in measuring vehicle speed. In some embodiments, one or more grip sensors 35 measure a grip force or pressure on the handwheel 14 at various locations, such as a left grip 15A and a right grip 15B defined in reference to a straight ahead position of the handwheel 14. In alternate embodiments, the grip sensors 35 are omitted, and grip magnitude and/or angular position values are computed using other parameters of the steering system 12.

A control module 40 controls the operation of the steering system 12 based on one or more of the sensor signals and further based on the steering control systems and methods of the present disclosure. The control module 40 generates a command signal to control the steering actuator motor 19 of the steering system 12 based on one or more of the inputs and further based on the steering control systems and methods of the present disclosure. The steering control systems and methods of the present disclosure adapt and compensate for a moment created by the grip style of a driver operating the handwheel 14.

Figure 2:
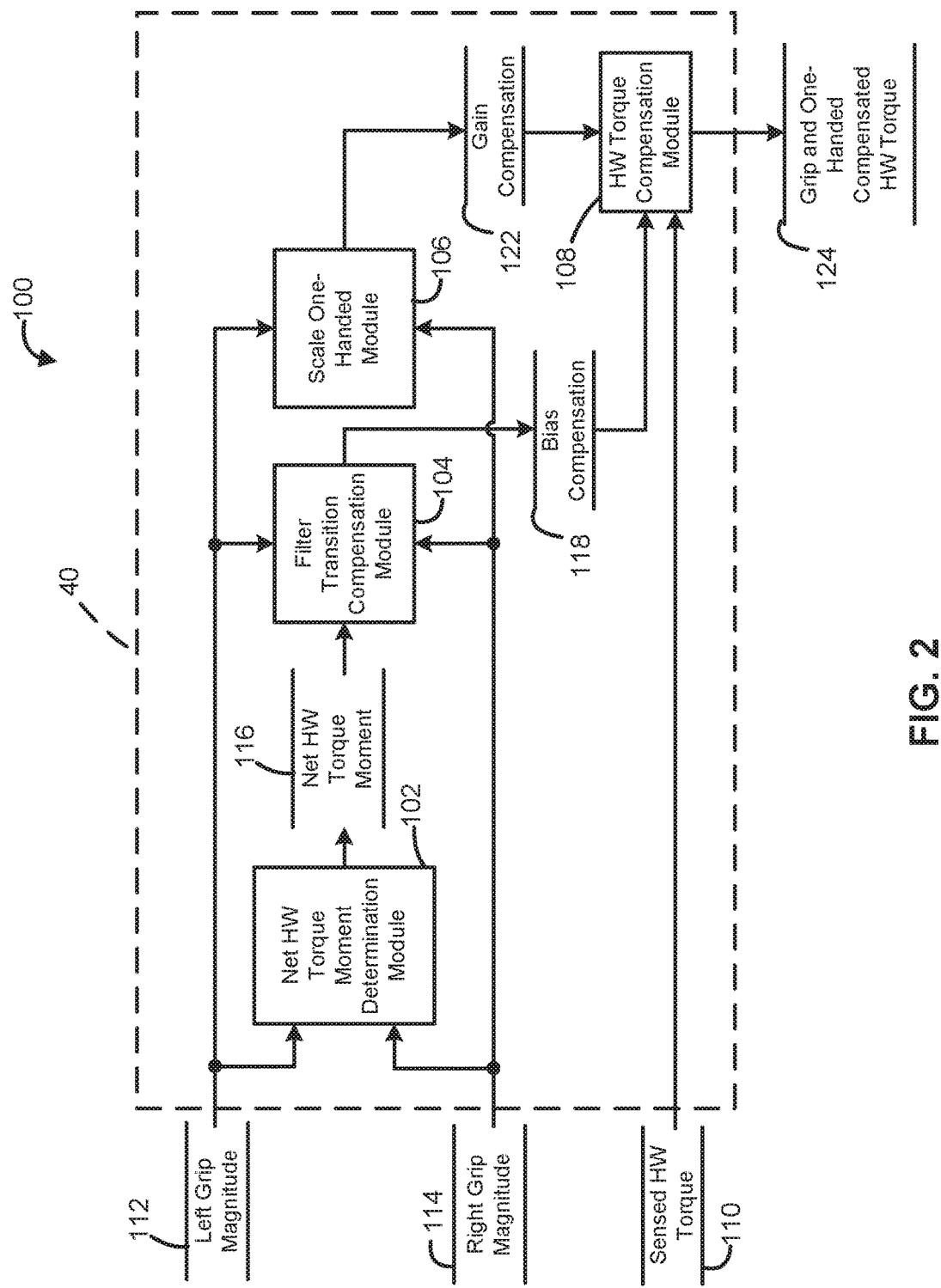
FIG. 2 illustrates a system for grip-based handwheel compensation in accordance with some embodiments.

FIG. 2 illustrates a system 100 for grip-based handwheel compensation according to an embodiment. The system 100 includes control module 40 and may include one or more of the sensors 31-35 of FIG. 1. In various embodiments, the control module 40 can include one or more sub-modules and datastores, such as a net handwheel torque moment determination module 102, a filter transition compensation module 104, a scale one-handed module 106, and a handwheel torque compensation module 108. As used herein the terms module and sub-module refer to an application specific integrated circuit (ASIC), an electronic circuit, a processor (shared, dedicated, or group) and memory that executes one or more software or firmware programs, a combinational logic circuit, or other suitable components that provide the described functionality. As can be appreciated, the control module 40 shown in FIG. 2 may be further partitioned and include additional control elements known in the art of steering control systems.

Inputs to the control module 40 may be generated from the sensors 31-35 (FIG. 1) of the vehicle 10 (FIG. 1) as well as other sensors (not depicted). In addition, the inputs may be received from other control modules (not shown) within the vehicle 10 (FIG. 1), and may be modeled or predefined. For example, a sensed handwheel torque 110 can be received at the control module 40 from the handwheel torque sensor 31 (FIG. 1). A left grip magnitude 112 of the left grip 115A (FIG. 1) can be received from a grip sensor 35 (FIG. 1) or be derived from other values. A right grip magnitude 114 of the right grip 115B (FIG. 1) can be received from a grip sensor 35 (FIG. 1) or be derived from other values. Alternatively, motor position/velocity signals from the motor position/velocity sensor 32 (FIG. 1), handwheel position/velocity signals from the handwheel position/velocity sensor 33 (FIG. 1), and/or the sensed handwheel torque 110 can be used to estimate the left grip magnitude 112 and the right grip magnitude 114 in combination with system configuration information, for instance, using a system model of mass/inertia components in the steering system 12 (FIG. 1). Force or pressure sensor readings can be used to estimate the left grip magnitude 112 and the right grip magnitude 114 based on a surface area of contact on the handwheel 14 (FIG. 1).

As a further example, a driver's hands can be considered to be on the handwheel 14 (FIG. 1) when the sensed handwheel torque 110 remains above a tunable threshold value for a tunable period of time. Various driver grip levels can be estimated based on the level of the sensed handwheel torque 110 over a period of time. High values of sensed handwheel torque 110 for a short duration of time (with respect to torque level and time thresholds) can be considered as a high level of grip, while lower values of sensed handwheel torque 110 for a longer period of time can indicate a weak grip. Various such tunable levels of grip can be obtained through analysis and developmental testing for particular system configurations.

As depicted in the example of FIG. 2 and with continued reference to FIG. 1, the net handwheel torque moment determination module 102 can determine a net handwheel torque moment 116 between the left grip 115A and the right grip 115B on handwheel 14 based on the left grip magnitude 112 and the right grip magnitude 114. The filter transition compensation module 104 can apply a filter to smooth transitions in the net handwheel torque moment 116 as a bias compensation 118 based on the left grip magnitude 112 and the right grip magnitude 114. The handwheel torque compensation module 108 can determine a grip compensated handwheel torque 120 (FIG. 4) based on a difference between the sensed handwheel torque 110 and the bias compensation 118.

Figure 4:
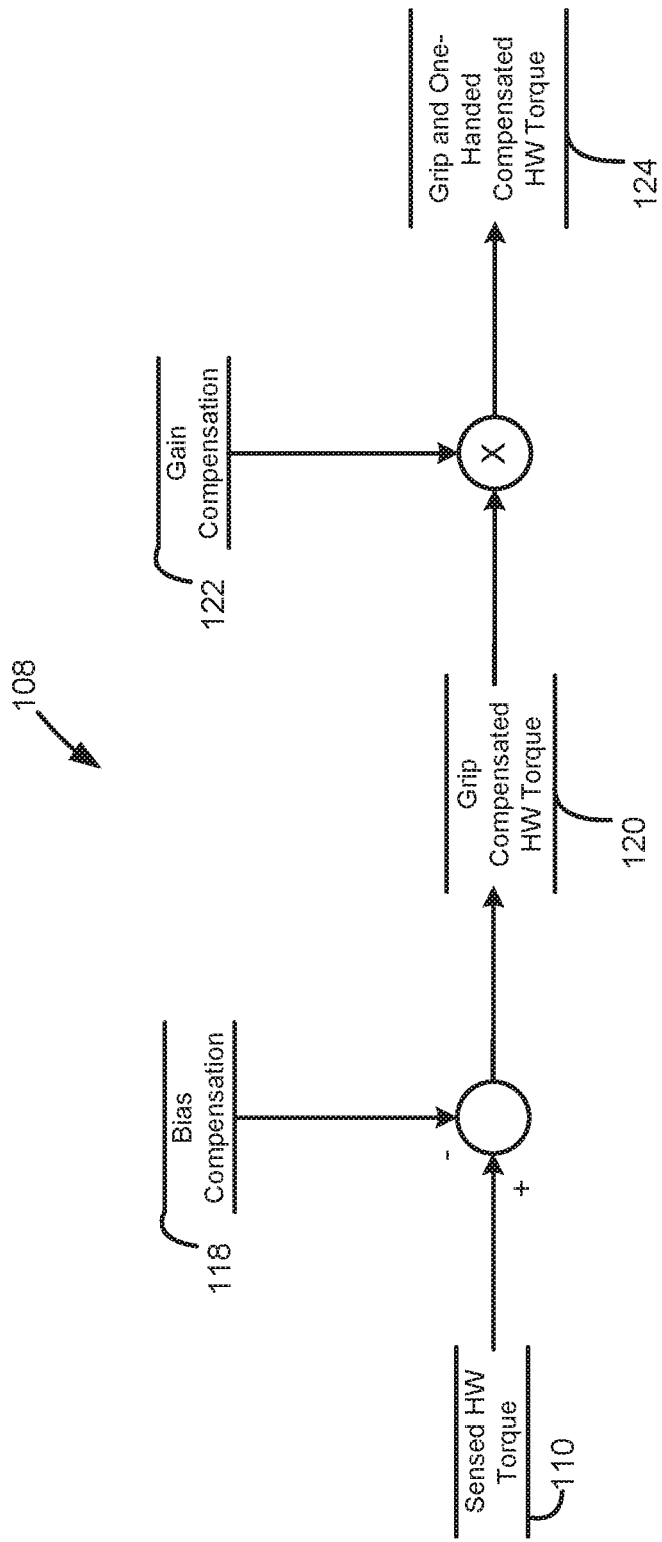
FIG. 4 illustrates a handwheel torque compensation module in accordance with some embodiments.

The scale one-handed module 106 can determine a gain compensation 122 to adjust a scaling of the grip compensated handwheel torque 120 between a one-handed grip and a two-handed grip handwheel steering mode. The scale one-handed module 106 can determine that the one-handed grip handwheel steering mode is active based on the left grip magnitude 112 or the right grip magnitude 114 falling below a grip magnitude threshold. In some embodiments, a detected change between the one-handed grip and the two-handed grip handwheel steering mode results in a gain change by the scale one-handed module 106. The gain compensation 122 can be a function of a lower value of the left grip magnitude 112 and the right grip magnitude 114. The gain compensation 122 can be filtered, for instance, by the scale one-handed module 106, to smooth transitions in the scaling of the grip compensated handwheel torque 120 between one and two-handed operation. The handwheel torque compensation module 108 can multiply the gain compensation 122 by the grip compensated handwheel torque 120 to produce a grip and one-handed compensated handwheel torque 124 as depicted in FIG. 4. The steering actuator motor 19 (FIG. 1) can be controlled based on the grip compensated handwheel torque 120 and/or the grip and one-handed compensated handwheel torque 124.

Figure 3:
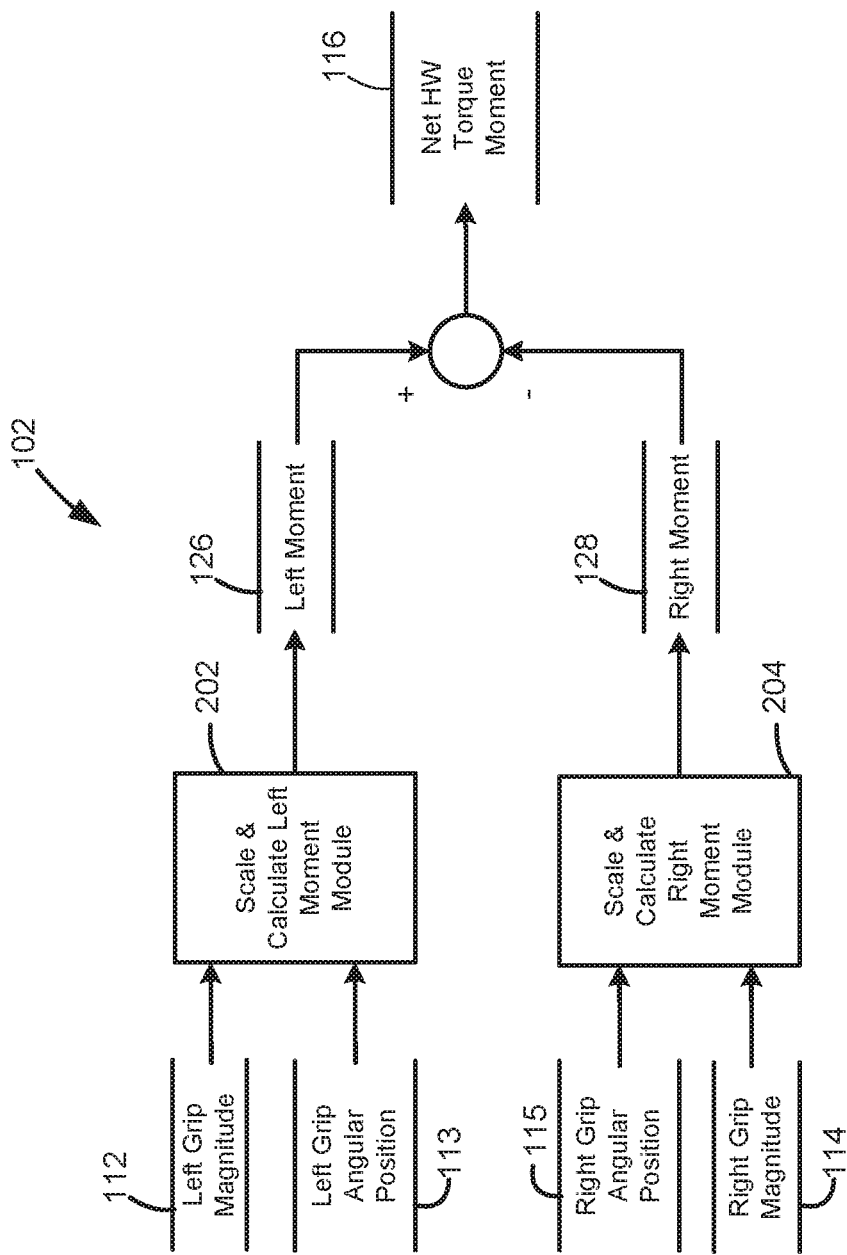
FIG. 3 illustrates a net handwheel torque moment determination module in accordance with some embodiments.

FIG. 3 depicts an example of the net handwheel torque moment determination module 102 in greater detail. In the example of FIG. 3, the net handwheel torque moment 116 is determined based on a left grip angular position 113 of the left grip 15A (FIG. 1) and a right grip angular position 115 of the right grip 15B (FIG. 1) of the handwheel 14 (FIG. 1) in reference to a straight ahead position. The left grip angular position 113 and the right grip angular position 115 can be determined based on readings from the grip sensors 35 (FIG. 1) and the handwheel position/velocity sensor 33 (FIG. 1). The net handwheel torque moment 116 is further determined based on a left moment 126 and a right moment 128 in response to a nominal measure of arm weight and geometry of the left grip angular position 113, the right grip angular position 115, and the handwheel 14. A scale and calculate left moment module 202 can produce the left moment 126 by scaling the left grip angular position 113 with respect to the left grip magnitude 112, for instance, as a product of the left grip magnitude 112 and an offset based on the left grip angular position 113. A scale and calculate right moment module 204 can produce the right moment 128 by scaling the right grip angular position 115 with respect to the right grip magnitude 114, for instance, as a product of the right grip magnitude 114 and an offset based on the right grip angular position 115. Left and right grip angular positions 113, 115 (as angles from vertical) and the radius of the handwheel 14 enable computation of the left moment 126 and right moment 128 respectively. The left grip magnitude 112 and right grip magnitude 114 can be applied for scaling depending on whether the grip is full or weak, which may indicate whether or not the full weight of an arm is transferred to the rim of the handwheel 14. The net handwheel torque moment 116 can be calculated as a difference between the left moment 126 and the right moment 128.

Figure 5:
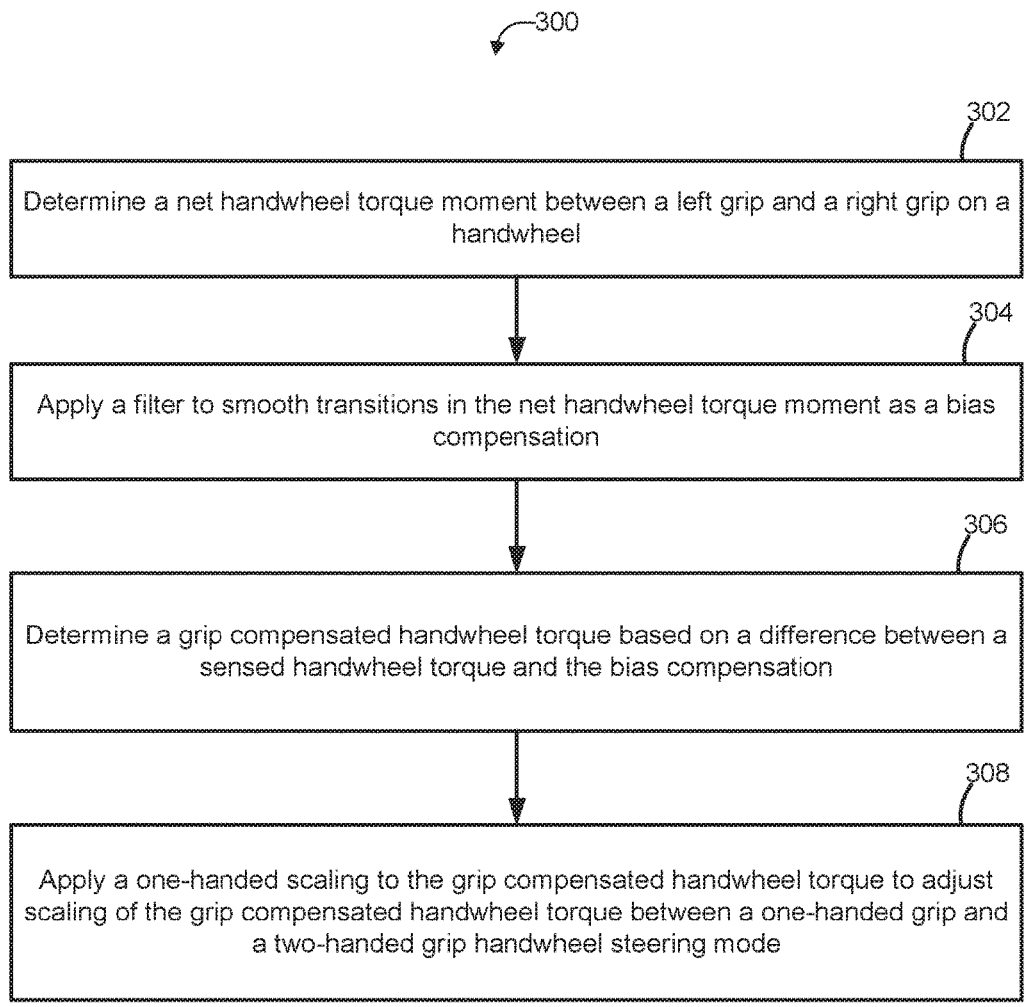
FIG. 5 illustrates a process for grip-based handwheel compensation in accordance with some embodiments.

FIG. 5 illustrates a process 300 for grip-based handwheel compensation. Process 300 is described in further reference to FIGS. 1-4. At block 302, net handwheel torque moment module 102 of control module 40 determines a net handwheel torque moment 116 between a left grip 15A and a right grip 15B on a handwheel 14. At block 304, a filter is applied (e.g., by filter transition compensation module 104) to smooth transitions in the net handwheel torque moment 116 as a bias compensation 118. At block 306, a grip compensated handwheel torque 120 is determined (e.g., by handwheel torque compensation module 108) based on a difference between a sensed handwheel torque 110 and the bias compensation 118. At block 308, a one-handed scaling is applied (e.g., by handwheel torque compensation module 108) as gain compensation 122 (e.g., from scale one-handed module 106) to the grip compensated handwheel torque 120 to adjust scaling of the grip compensated handwheel torque 120 between a one-handed grip and a two-handed grip handwheel steering mode and produce the grip and one-handed compensated handwheel torque 124. The one-handed scaling can be a gain compensation 122 that is filtered to smooth transitions in the scaling of the grip compensated handwheel torque 120, for instance, when switching between one-handed and two-handed grips. The grip and one-handed compensated handwheel torque 124 can be used in place of the sensed handwheel torque 110 as a compensated value in control algorithms of the control module 40 used to command the steering actuator motor 19 of the steering system 12, thereby compensating for various grip patterns and one/two handed operation as opposed to an expected two-handed grip pattern at 10/2 or 9/3 o'clock on the handwheel 14.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for grip-based handwheel compensation, the system comprising:
   a net handwheel torque moment determination module that determines a net handwheel torque moment between a left grip and a right grip on a handwheel;
   a filter transition compensation module that applies a filter to smooth transitions in the net handwheel torque moment as a bias compensation; and
   a handwheel torque compensation module that determines a grip compensated handwheel torque based on a difference between a sensed handwheel torque and the bias compensation; and
   a control module that controls an actuator motor based on the grip compensated handwheel torque.

2. The system of claim 1, further comprising a scale one-handed module that determines a gain compensation to adjust a scaling of the grip compensated handwheel torque between a one-handed grip and a two-handed grip handwheel steering mode.

3. The system of claim 2, wherein the scale one-handed module determines that the one-handed grip handwheel steering mode is active based on a magnitude of the left grip or the right grip falling below a grip magnitude threshold.

4. The system of claim 3, wherein the gain compensation is a function of a lower value of the magnitude of the left grip and the right grip, and the gain compensation is filtered to smooth transitions in the scaling of the grip compensated handwheel torque.

5. The system of claim 1, wherein the net handwheel torque moment is determined based on a left grip angular position and a right grip angular position of the handwheel in reference to a straight ahead position.

6. The system of claim 5, wherein the net handwheel torque moment is further determined based on a left moment and a right moment in response to a nominal measure of arm weight and geometry of the left grip angular position, the right grip angular position, and the handwheel.

7. The system of claim 6, wherein the left moment is a product of a magnitude of the left grip and an offset based on the left grip angular position, and the right moment is a product of a magnitude of the right grip and an offset based on the right grip angular position.

8. A steering system comprising:
   a handwheel torque sensor operable to produce a sensed handwheel torque;
   a steering actuator motor; and
   a control module operable to determine a net handwheel torque moment between a left grip and a right grip on a handwheel, apply a filter to smooth transitions in the net handwheel torque moment as a bias compensation, determine a grip compensated handwheel torque based on a difference between the sensed handwheel torque and the bias compensation, and control the steering actuator motor based on the grip compensated handwheel torque.

9. The steering system of claim 8, wherein the control module is operable to determine a gain compensation to adjust a scaling of the grip compensated handwheel torque between a one-handed grip and a two-handed grip handwheel steering mode.

10. The steering system of claim 9, wherein the control module is operable to determine that the one-handed grip handwheel steering mode is active based on a magnitude of the left grip or the right grip falling below a grip magnitude threshold.

11. The steering system of claim 10, wherein the gain compensation is a function of a lower value of the magnitude of the left grip and the right grip, and the gain compensation is filtered to smooth transitions in the scaling of the grip compensated handwheel torque.

12. The steering system of claim 8, wherein the net handwheel torque moment is determined based on a left grip angular position and a right grip angular position of the handwheel in reference to a straight ahead position.

13. The steering system of claim 12, wherein the net handwheel torque moment is further determined based on a left moment and a right moment in response to a nominal measure of arm weight and geometry of the left grip angular position, the right grip angular position, and the handwheel.

14. The steering system of claim 13, wherein the left moment is a product of a magnitude of the left grip and an offset based on the left grip angular position, and the right moment is a product of a magnitude of the right grip and an offset based on the right grip angular position.

15. A method for grip-based handwheel compensation, the method comprising:
  determining, by a control module of a steering system, a net handwheel torque moment between a left grip and a right grip on a handwheel;
  applying a filter to smooth transitions in the net handwheel torque moment as a bias compensation;
  determining a grip compensated handwheel torque based on a difference between a sensed handwheel torque and the bias compensation; and
  controlling an actuator motor based on the grip compensated handwheel torque.

16. The method of claim 15, further comprising:
  applying a one-handed scaling to the grip compensated handwheel torque to adjust scaling of the grip compensated handwheel torque between a one-handed grip and a two-handed grip handwheel steering mode as a grip and one-handed compensated handwheel torque, wherein the one-handed scaling is a gain compensation that is filtered to smooth transitions in the scaling of the grip compensated handwheel torque.

17. The method of claim 16, further comprising:
  determining that the one-handed grip handwheel steering mode is active based on a magnitude of the left grip or the right grip falling below a grip magnitude threshold.

18. The method of claim 15, wherein the net handwheel torque moment is determined based on a left grip angular position and a right grip angular position of the handwheel in reference to a straight ahead position.

19. The method of claim 18, wherein the net handwheel torque moment is further determined based on a left moment and a right moment in response to a nominal measure of arm weight and geometry of the left grip angular position, the right grip angular position, and the handwheel.

20. The method of claim 19, wherein the left moment is a product of a magnitude of the left grip and an offset based on the left grip angular position, and the right moment is a product of a magnitude of the right grip and an offset based on the right grip angular position.

\* \* \* \* \*